(12) United States Patent
Kushnir et al.

(10) Patent No.: US 6,478,567 B1
(45) Date of Patent: Nov. 12, 2002

(54) NOZZLE ASSEMBLY FOR INJECTION MOLDING

(75) Inventors: Yosif Kushnir, Overland Park, KS (US); Ian Fitzpatrick, New Market (CA)

(73) Assignee: Dollins Tool, Inc., Independence, MO (US)

( * ) Notice: Subject to any disclaimer, the term of this patent is extended or adjusted under 35 U.S.C. 154(b) by 92 days.

(21) Appl. No.: 09/610,272

(22) Filed: Jul. 6, 2000

Related U.S. Application Data

(63) Continuation-in-part of application No. 08/802,707, filed on Feb. 19, 1997, now abandoned.

(51) Int. Cl.[7] .............................................. B29C 45/20
(52) U.S. Cl. ...................... 425/191; 425/549; 425/568
(58) Field of Search ................................. 425/190, 191, 425/192 R, 568, 569, 571, 549

(56) References Cited

U.S. PATENT DOCUMENTS

| | | | |
|---|---|---|---|
| 2,529,146 A | * 11/1950 | Feitl ............................ | 425/191 |
| 4,268,241 A | * 5/1981 | Rees et al. .................. | 425/548 |
| 4,312,630 A | * 1/1982 | Travaglini .................. | 219/421 |
| 4,333,608 A | 6/1982 | Hendry ....................... | 425/563 |
| 4,434,053 A | 2/1984 | Osuna-Diaz ................ | 425/568 |
| 5,054,689 A | 10/1991 | Hunerberg et al. ......... | 425/564 |
| 5,106,283 A | 4/1992 | Sauer et al. ................ | 425/564 |
| 5,208,052 A | 5/1993 | Schmidt et al. ............. | 425/549 |
| 5,421,716 A | 6/1995 | Gellert ........................ | 425/549 |
| 5,464,342 A | 11/1995 | Marik et al. ................ | 425/533 |
| 5,484,275 A | 1/1996 | Kushnir ...................... | 425/549 |
| 5,589,206 A | 12/1996 | Hepler ........................ | 425/549 |
| 5,700,499 A | 12/1997 | Bauer ......................... | 425/564 |

FOREIGN PATENT DOCUMENTS

GB       1097325     * 1/1968      ................. 425/191

* cited by examiner

*Primary Examiner*—Jan H. Silbaugh
*Assistant Examiner*—Joseph Leyson
(74) *Attorney, Agent, or Firm*—Shook, Hardy & Bacon L.L.P.

(57) ABSTRACT

A three piece nozzle assembly for injecting molten plastic in an injection molding machine carrying out a high pressure, high volume continuous molding process to mold thin walled parts. A nozzle housing has an internally threaded dual diameter bore in one end which receives in one bore portion an externally threaded shank of a nozzle. A sleeve is threaded into the other bore portion and is tightened adjacent to a flange on the nozzle shank to lock the nozzle to the housing and prevent the pressure of the injection molding from working the nozzle loose from the housing. A gap is formed between the sleeve and nozzle shank to reduce the thermal effects.

10 Claims, 3 Drawing Sheets

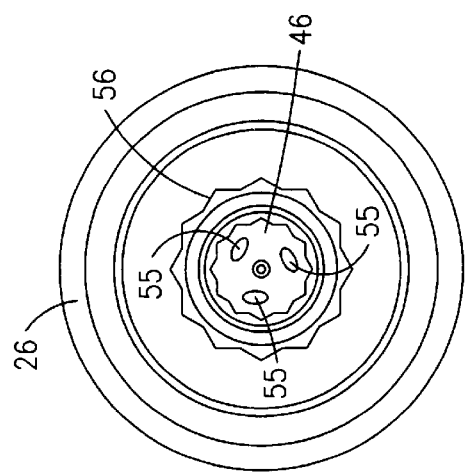
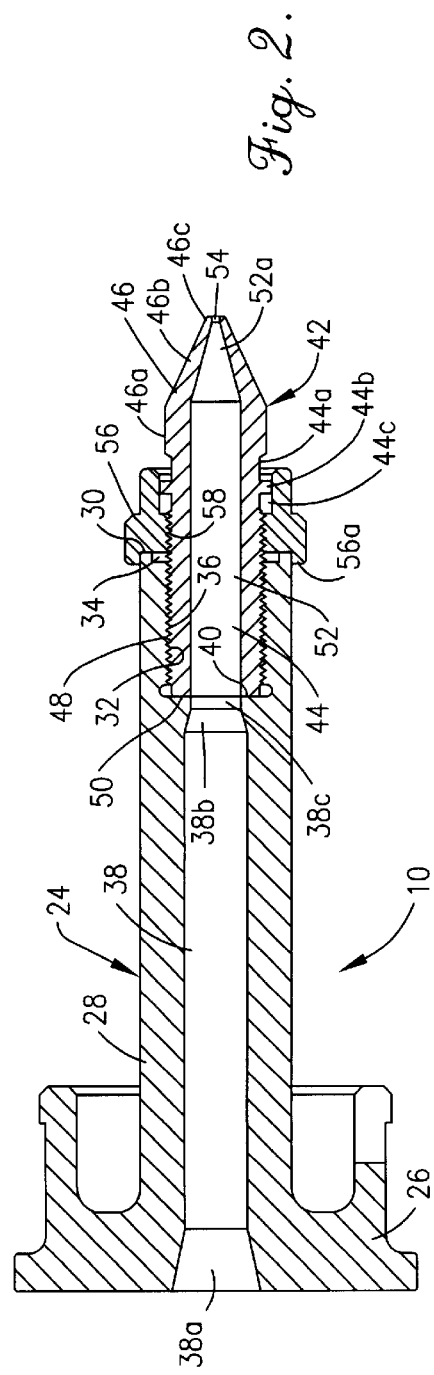
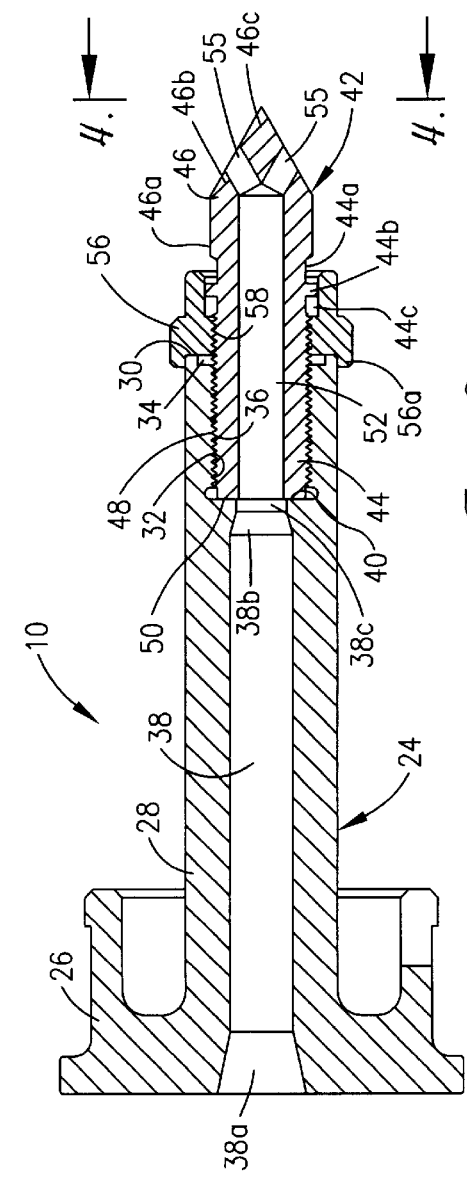

NOZZLE ASSEMBLY FOR INJECTION MOLDING

RELATED APPLICATION

This application is a continuation-in-part of application Ser. No. 08/802,707, filed Feb. 19, 1997, now abandoned.

FIELD OF THE INVENTION

This invention relates generally to the field of injection molding and more particularly to an improved nozzle assembly for use in injection molding operations that involve molding of thin walled parts using continuous high volume molding at high pressure and high speed.

BACKGROUND OF THE INVENTION

Injection molding equipment has long made use of nozzles for injecting the molten plastic into the mold cavities. Thin walled parts have been commonly manufactured by this type of injection molding process. Thin walled parts such as plastic cups and other articles are usually molded using continuous high volume molding techniques carried out at high pressure and high speed. There is no shut off mechanism for the nozzle in a continuous molding operation of this type. Cycles are carried out successively at high speed and rapid injection of molten plastic with the nozzle continuously open to flow. High pressures are also required in this type of molding process. By way of example, flow through the injection nozzle during each cycle occurs for approximately 0.2 second. Pressures of between 20,000 psi and 30,000 psi are typically involved. This is in contrast to molding operations for larger parts that take place much more slowly and at much lower pressures.

It has been the normal practice in the past for the nozzle assembly to be formed by a housing and a probe or nozzle head which is screwed into the housing. Although this type of arrangement has been widely used, it has not been wholly without problems in applications involving continuous high volume molding operations.

Perhaps the most serious problem has been the tendency for the nozzle to come loose from the housing. The repeated application of high pressures in rapid succession during the molding process can inadvertently work the threads of the nozzle loose from the threads of the housing. Eventually, the nozzle completely detaches from the housing. When this occurs, the mold must be shut down, and the parts that are the source of the problem must be located, cleaned and either reassembled or replaced before the molding equipment can resume operation. This can result in considerable down time for the molding machinery and can cause large financial problems due to lost production. Modem molding equipment for thin walled parts often makes use of molds that provide a large number of mold cavities, so the production losses can be substantial each time even one of the nozzles works loose from its housing.

The high temperatures that are involved also create problems. If the nozzle head is rigidly secured to the nozzle housing, the nozzle or other components can crack due to the thermal expansion that occurs under high temperature operation. The high pressures and fast cycle turns involved in the high volume continuous molding process exacerbate this problem. If a part cracks or is otherwise damaged due to thermal problems, the downtime of the machinery creates all of the difficulties discussed previously. Accordingly, it is of considerable importance to recognize and make provision for thermal expansion effects.

SUMMARY OF THE INVENTION

It is the principal object of the present invention to provide a nozzle assembly for injection molding which functions more reliably than existing nozzles and which is not subject to detachment of the parts that can cause undue downtime of the molding equipment.

Another object of the invention is to provide a nozzle assembly of the character described which is not subject to cracking or other damage due to the effects of thermal expansion.

It is also an object of the invention to provide an improved nozzle assembly of the character described which is simple and economical to manufacture, easy to use properly, and applicable to existing equipment.

The problems which have plagued existing nozzle assemblies are eliminated or at least minimized by the nozzle assembly of the present invention. In accordance with one embodiment of the invention, a three-piece nozzle assembly includes a nozzle housing, a nozzle, and a jam nut. The housing has a barrel which presents an internally threaded bore in one of its ends. The nozzle has an externally threaded shank which is screwed into the bore and tightened against an internal shoulder at the end of the bore. The jam nut is threaded onto the nozzle shank and is tightened against the end of the housing. This securely locks the nozzle to the housing so that the pressure applied during operation will not cause the nozzle to screw out of the housing as occurs with existing devices.

In accordance with another embodiment of the invention, which is preferred for most applications, the nozzle is threaded into the bore of the housing and has a projecting flange which abuts an internal shoulder in the bore when the nozzle is fully installed. A threaded sleeve or collar is applied around the nozzle and is threaded into an enlarged portion of the bore and tightened against the flange. The sleeve prevents the nozzle from working loose during operation of the molding equipment and is threaded to the housing rather than to the nozzle. This minimizes the area of the sleeve in contact with the nozzle to minimize heat conduction to the sleeve. A gap is presented between the nozzle and sleeve for a major part of the sleeve length to further reduce heat transfer. Preferably, a small gap is present between the end of the nozzle and the shoulder it abuts, and also between the flange and the sleeve so that thermal expansion is accommodated without causing the parts to crack or deform unduly at high temperatures.

BRIEF DESCRIPTION OF THE DRAWINGS

In the accompanying drawings which form a part of the specification and are to be read in conjunction therewith and in which like reference numerals are used to indicate like parts in the various views:

FIG. 2 is a sectional view taken through the nozzle assembly shown in FIG. 1, with a straight tip nozzle shown;

FIG. 3 is a sectional view similar to FIG. 2, but showing a diverter nozzle threaded into the housing;

FIG. 4 is a front elevational view taken generally along line 4—4 of FIG. 3 in the direction of the arrows.

DETAILED DESCRIPTION OF THE INVENTION

Figure 1:
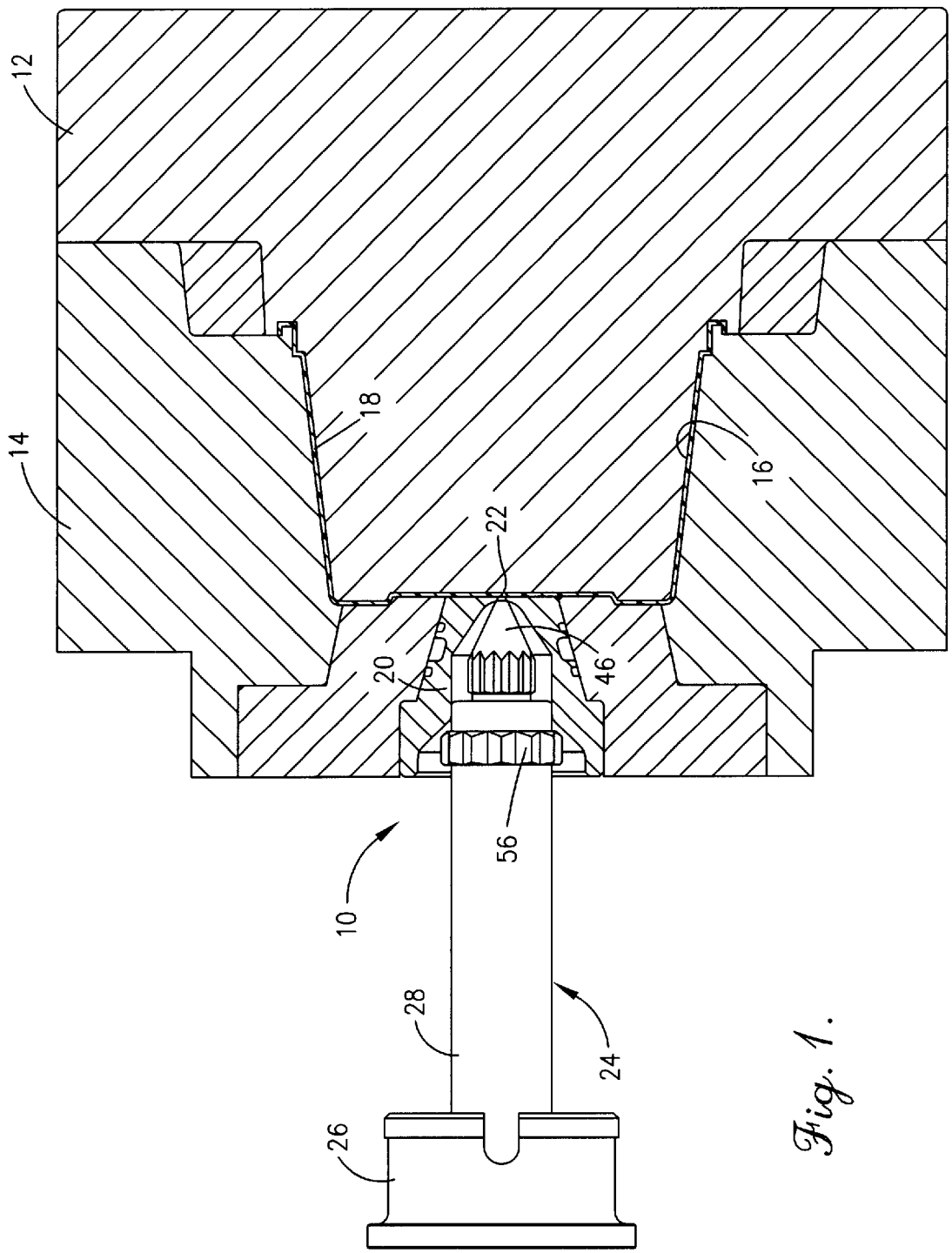
FIG. 1 is a diagrammatic sectional view through a mold which is equipped with a nozzle assembly constructed according to one embodiment of the present invention.

Referring now to the drawings in more detail and initially to FIG. 1, numeral 10 generally designates a nozzle assembly which is constructed in accordance with a preferred embodiment of the present invention and which is used for the injection of molten plastic during injection molding operations. The molding equipment includes a core plate 12 and a cavity plate assembly 14 which cooperate when closed to present a mold cavity 16. Molten plastic is injected into the mold cavity 16 to form an injection molded part 18 which takes the shape of the mold cavity 16. The nozzle assembly 10 cooperates with a gate insert 20 which is fitted to the mold cavity plate assembly 14 and which provides an injection port 22 through which the molten plastic is injected from the nozzle assembly 10 into the mold cavity 16. FIG. 1 depicts the mold plates in the closed position to injection mold a part 18 which may be a thin walled bowl or tub used in food packaging, for example.

The nozzle assembly 10 is shown in detail in FIG. 2. A nozzle housing 24 has an enlarged base 26 at one end and a cylindrical barrel 28 which extends from the base 26. The barrel 28 terminates in a free end 30 into which a cylindrical bore 32 extends. The end 30 of barrel 28 is provided with an annular recess 34 which extends around the bore 32 and is recessed into the end face of the barrel 28.

The bore 32 extends within the end portion of barrel 28 and is internally threaded such that it presents threads 36 on the bore wall. A passage 38 extends axially through the nozzle housing 24. The passage 38 is cylindrical for the most part. An end portion 38a which extends into the face of the base 26 is tapered as it extends toward the main part of the passage 38. At the opposite end of the passage, a transition portion 38b tapers from the main portion of the passage to connection with a reduced diameter end portion 38c of the passage. The end portion 38c intersects with the bore 32 and is smaller in diameter than the bore. A flat annular shoulder 40 is formed within the barrel 28 at the intersection between bore 32 and the end portion 38c of the passage 38. The shoulder 40 faces toward the end 30 of the barrel.

The nozzle assembly 10 further includes a nozzle which is generally identified by numeral 42. The nozzle 42 has a cylindrical shank 44 and a nozzle head 46 on one end of the shank 44. The shank 44 is externally threaded throughout the majority of its length, as indicated at 48. The threads 48 mate with the internal threads 36 of the bore 32 to allow the nozzle 42 to be threaded into the housing 24. The shank 44 terminates in a flat annular end 50 which butts against the shoulder 40 when the nozzle 42 is fully threaded into the barrel 28 of the nozzle housing.

The nozzle head 46 is integral with the shank 44 and includes a short cylindrical portion 46a and a conical portion 46b which tapers from portion 46a to a tip 46c.

The shank 44 has a short unthreaded portion 44a which extends between the threads 48 and the nozzle head portion 46a. An annular collar 44b extends outwardly from the unthreaded portion 44a to present a small annular groove 44c between the collar 44b and the threads 48. The groove 44c serves to relieve stress on the threads when the nozzle 42 is threaded into the housing 24.

A passageway 52 extends axially through the nozzle 42. The majority of the passageway 52 is cylindrical and is substantially the same diameter as the end portion 38c of the passage 38. Within the nozzle head 46, the passage 52 presents a tapered portion 52a which tapers toward the tip 46c. In the straight tip embodiment of FIG. 2, a single port or discharge opening 54 is located in the tip 46c and connects with the passageway portion 52a in order to inject the molten plastic into the mold cavity.

The nozzle assembly 10 includes a third part which takes the form of a jam nut 56. The jam nut 56 is internally threaded at 58 in order to mate with the external threads 48 of the nozzle shank 44. The base end of the jam nut 56 presents a flat surface which engages the end 30 of barrel 28 when the jam nut is fully applied. A skirt 56a projecting from the base end of the jam nut fits closely around the body of the barrel 28 adjacent the end 30. When the jam nut 56 is fully applied as shown in FIG. 2, its main body portion fits closely around the collar 44b in order to enclose the stress relieving groove 44c.

The nozzle assembly 10 is assembled by initially threading the jam nut 56 onto the shank 44 of the nozzle. The jam nut is started on the end 50 of the shank and is initially threaded onto the threads 48 as far as possible until it is limited by engagement with the side of the collar 44b. The shank 44 is then threaded into bore 32 as far as possible until the end 50 comes into contact with the shoulder 40. Preferably, the nozzle is tightened to a preselected torque level. Then, the jam nut 56 is threaded toward the housing 24 until its flat base surface is engaged against the end 30 of barrel 28 in the position of FIG. 2. Again, the nut 56 is preferably tightened to a specified torque level.

The nozzle assembly 10 is then fully assembled and may be applied to the mold in the manner shown in FIG. 1. The nozzle head 46 is inserted into the cavity presented within the gate insert 20 generally to the position shown in FIG. 1. Molten plastic can then be injected into the nozzle assembly with suitable injection molding machinery (not shown). The molten plastic enters end 38a of the passage 38 and flows through the passage into the passageway 52 presented within the nozzle. The plastic is injected through the discharge opening 54 and fills the mold cavity 16 in order to form the molded part 18.

The jam nut 56 acts to securely lock the nozzle 42 to the housing 24. Because the nozzle is threaded to the housing and the jam nut is threaded onto the nozzle shank and tightened against the end of the housing, the nozzle 46 will not work itself loose from the housing 24 by unthreading unless the jam nut is first loosened. The jam nut can be loosened intentionally when it is desired to disassemble the components, but the pressurization to which the nozzle is subjected during operation of the molding machine will not cause the jam nut or the nozzle to work loose. Consequently, the parts of the nozzle assembly 10 are securely held in place, and the nozzle is not inadvertently detached from the housing as occurs with prior nozzle assemblies.

FIG. 3 depicts an alternative embodiment of the invention which differs from the FIG. 2 embodiment only in that the nozzle head 46 has a diverter construction which provides three outlet openings 55 rather than the single opening 54 in the straight tip configuration shown in FIG. 2. The three openings 55 connect with the passageway 52 and intersect with the conical face of the tapered portion 46b of the nozzle head 46. In all other respects, the embodiment shown in FIG. 3 may be identical to that shown in FIG. 2. The FIG. 3 embodiment is assembled in the same manner as the FIG. 2 embodiment and operates in substantially the same fashion to inject molten plastic into a mold cavity through the three openings 55.

Figure 5:
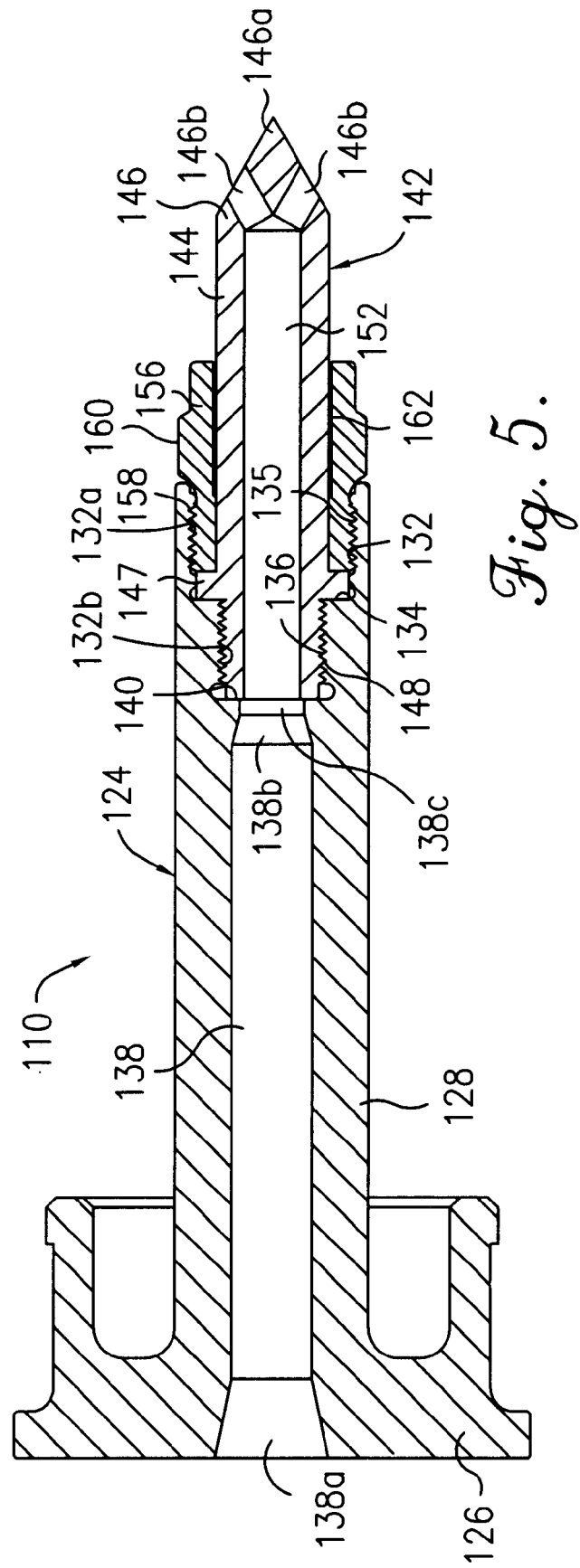
FIG. 5 is a sectional view of a nozzle assembly constructed according to another and preferred embodiment of the invention.

FIG. 5 shows a nozzle assembly 110 which is constructed similarly to the nozzle assembly 10 but is different in some material respects. A nozzle housing 124 has an enlarged base 126 at one end and a cylindrical barrel 128 which extends from the base 126. The barrel 128 terminates in a free end into which a dual diameter bore 132 extends. The outer end portion 132a of bore 132 has a larger diameter than the inner end portion 132b of the bore. A flat annular shoulder 134 is formed at the intersection between the bore portions 132a and 132b.

The bore 132 extends within the end portion of barrel 128. Portion 132a of the bore is internally threaded such that it presents threads 135 on the bore wall. Portion 132b is similarly threaded internally at 136. A passage 138 extends axially through the nozzle housing 124. The passage 138 is cylindrical for the most part. An end portion 138a which extends into the face of the base 126 is tapered as it extends toward the main part of the passage 138. At the opposite end of the passage, a transition portion 138b tapers from the main portion of the passage to connection with a reduced diameter end portion 138c of the passage. The end portion 138c intersects with the bore portion 132b and is smaller in diameter than portion 132b. A flat annular shoulder 140 is formed within the barrel 128 at the intersection between bore portion 132b and the end portion 138c of the passage 138. The shoulder 140 faces toward the free end of the barrel 128.

The nozzle assembly 110 includes a nozzle which is generally identified by numeral 142. The nozzle 142 has a cylindrical shank 144 and a tapered nozzle head 146 on one end of the shank 144. The shank 144 is provided with an outwardly projecting flange 147 and is threaded along its base end portion up to the flange 147, as indicated at 148. The threads 148 mate with the internal threads 136 of the bore portion 132b to allow the nozzle 142 to be threaded into the housing 124. The end of the shank 144 is adjacent to the shoulder 140 when the nozzle 142 is fully threaded into the barrel 128 of the nozzle housing. Similarly, the flange 147 is adjacent to shoulder 134. The shank 144 is spaced inwardly from the wall of bore portion 132a.

The nozzle head 146 is integral with the shank and tapers to a pointed tip 146a. A passageway 152 extends axially through the nozzle 142. The majority of the passageway 152 is cylindrical and is substantially the same diameter as the end portion 138c of the passage 138. Three discharge openings 146b extend from the end of passage 152 and terminated at the conical surface of the nozzle head 146 in order to inject the plastic from the nozzle. Alternatively, the nozzle head may have a single discharge opening at the nozzle tip 146a, much like the configuration shown in FIG. 2.

The nozzle assembly 110 includes a third part which takes the form of a collar or sleeve 156. The sleeve 156 is externally threaded at 158 in order to mate with the internal threads 135 of bore portion 132a. The wall of sleeve 156 has a thickness to fit in the space between the nozzle shank 144 and the wall around bore portion 132a. The base end of the sleeve 156 presents a flat surface which is adjacent to the flange 147 when the sleeve is fully applied. A portion of sleeve 156 which remains out of the bore 132 is provided with a surface 160 suitable for receiving a tool used to tighten the sleeve. When the sleeve 156 is fully applied as shown in FIG. 5, it fits around the shank 144. However, the parts are constructed to present a small gap 162 between shank 144 and sleeve 156 through the majority of the length of the sleeve on the outer end portion of the sleeve.

The nozzle assembly 110 is assembled by initially threading the shank 144 into bore portion 132b until the end of the shank is adjacent to the shoulder 140. Preferably, when the nozzle is fully applied there is a small gap ($\frac{1}{1000}$ inch, for example) between the end of shank 144 and shoulder 140. Likewise, although flange 147 is adjacent to shoulder 134, there is preferably a comparable gap between the flange and shoulder. These gaps accommodate thermal expansion of the parts without causing them to crack or deform unduly.

After the nozzle 142 has been threaded to the housing 124 in this manner, the sleeve 156 is inserted into bore portion 132a with the threads 158 of the sleeve mating with threads 135. There is preferably a gap between the inner end of sleeve 156 and flange 147 to accommodate thermal expansion. The gap 162 between shank 144 and sleeve 156 reduces heat transfer and thus minimizes the thermal effects.

The nozzle assembly 110 is then fully assembled and may be applied to the mold in the manner shown in FIG. 1 and used in the same fashion as the nozzle assembly 10.

The sleeve 156 acts to securely lock the nozzle 142 to the housing 124. Because the nozzle is threaded to the housing and the sleeve 156 is also threaded to the housing rather than to the nozzle, the nozzle 146 is unable to work itself loose from the housing 124 by unthreading unless the sleeve 156 is first loosened. The sleeve can be loosened intentionally when it is desired to disassemble the components, but the pressurization to which the nozzle is subjected during operation of the molding machine will not cause the sleeve or the nozzle to work loose. Consequently, the parts of the nozzle assembly 110 are securely held in place, and the nozzle is not inadvertently detached from the housing as occurs with prior nozzle assemblies.

By threading the sleeve 156 to the housing 124 rather than onto the nozzle 142, and by providing gaps that accommodate thermal expansion, the nozzle 142 is held in place and the parts are not rigidly secured such that they are subject to cracking due to thermal expansion at high temperatures. This makes the arrangement of FIG. 5 particularly advantageous for molding thin wall parts using a continuous high volume molding process carried out at high pressure and high speed. In this type of molding process, prior nozzles have been susceptible to working loose due to the repeated quick pressurizations that occur in successive cycles and at high temperature operation, as is necessary to make such parts efficiently at a low cost. The molding of larger parts, often with gas injection, takes place more slowly and at lower pressures and longer cycle times so that loosening of the nozzle is not a significant problem.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, we claim:

1. A nozzle assembly for injecting molten plastic into a mold cavity, said nozzle assembly comprising:

a nozzle housing presenting a passage therethrough for receiving the molten plastic, said passage having a configuration to present a shoulder therein;

a nozzle having a detachable threaded connection with said housing and a passageway communicating with said passage when the nozzle is connected with the housing, said nozzle having a discharge opening for injecting the molten plastic into the mold cavity;

a shank portion of said nozzle having an outer end portion and an inner end portion providing said detachable connection of said nozzle with said housing;

an enlarged flange on said shank portion of said nozzle at a location between said inner and outer end portions and adjacent to said shoulder;

internal threads on said nozzle housing extending at a location spaced outwardly from said nozzle when the nozzle is connected to the housing; and a sleeve having a threaded connection with said internal threads on the nozzle housing and being adapted to be tightened on said internal threads to a position adjacent said flange to lock the nozzle to said nozzle housing, said sleeve fitting on said nozzle in a manner to present a gap between said sleeve and said shank portion along a majority of the length of said outer end portion of said shank portion.

2. A nozzle assembly as set forth in claim 1, wherein said housing presents a bore having a relatively small portion into which said nozzle is threaded and a relatively large portion presenting said internal threads.

3. A nozzle assembly as set forth in claim 1, including a second shoulder in said bore and an end of said shank portion adjacent to said second shoulder.

4. A nozzle assembly as set forth in claim 2, wherein said sleeve is disposed in said relatively larger portion of said bore between said nozzle and said internal threads on said housing.

5. A nozzle assembly as set forth in claim 1, wherein said housing has a base and a barrel extending from said base, said barrel having an internally threaded bore, said shank portion of said nozzle having a threaded connection with said internally threaded bore to establish said detachable threaded connection.

6. A nozzle assembly as set forth in claim 5 wherein said bore terminates at a second shoulder presented in said barrel, said shank portion being threaded into said bore adjacent to said second shoulder.

7. A nozzle assembly for injecting molten plastic into a mold cavity in a continuous high volume molding process for molding thin walled parts, said nozzle assembly comprising:

a nozzle housing having a base and a barrel extending from said base, said housing presenting a passage therethrough for receiving the molten plastic;

a shoulder in said passage facing away from said base;

an end portion of said barrel presenting a bore connecting with said passage;

a nozzle having an externally threaded shank and a nozzle head on said shank, said shank having an outer end portion and an inner end portion presenting external threads establishing a threaded connection with said bore to connect said nozzle with said housing;

an enlarged flange on said shank located adjacent to but spaced from said shoulder to present a heat expansion gap between said flange and shoulder;

a passageway through said nozzle communicating with said passage when the nozzle is connected with the housing;

at least one discharge opening in said nozzle head for receiving molten plastic from said passageway and injecting the plastic into the mold cavity; and a sleeve threaded into said bore and having a fully tightened condition wherein said sleeve is adjacent to said flange to prevent the nozzle from unthreading from the housing, said sleeve fitting on said nozzle in a manner to present a gap between said sleeve and said outer end portion of said shank along a majority of the length of said outer end portion of said shank.

8. A nozzle assembly as set forth in claim 7, wherein said bore terminates at a second shoulder presented in said barrel, said shank being threaded into said bore adjacent to said second shoulder.

9. A nozzle assembly for injecting molten plastic into a mold cavity in a continuous high volume molding process for molding thin walled parts, said nozzle assembly comprising:

a nozzle housing having a barrel presenting a passage therethrough for receiving the molten plastic, said barrel terminating in an end;

an internally threaded bore in said barrel extending into said end thereof, said bore having threaded first and second portions and presenting a first shoulder at one end of said first portion and a second shoulder between said first and second portions;

a nozzle having a shank and a nozzle head presenting a discharge opening for injecting molten plastic into the mold cavity, said shank having an outer end portion and an inner end portion which is externally threaded into said first portion of said bore and said shank having an end adjacent to but spaced from said first shoulder to provide a heat expansion gap between said end of the shank and said first shoulder;

an enlarged flange on said shank adjacent said second shoulder;

a passageway through said nozzle providing a flow path for the molten plastic between said passage and said discharge opening; and an externally threaded sleeve threaded into said second portion of said bore adjacent to said flange to secure the nozzle to said housing, said sleeve fitting on said nozzle in a manner to present a gap between said sleeve and outer end portion of said shank along a majority of the length of said outer end portion of said shank.

10. A nozzle assembly as set forth in claim 9, wherein said first portion of said bore has a lesser diameter than said second portion.

* * * * *

(12) EX PARTE REEXAMINATION CERTIFICATE (5045th)
United States Patent
Kushnir et al.

(10) Number: US 6,478,567 C1
(45) Certificate Issued: Dec. 21, 2004

(54) NOZZLE ASSEMBLY FOR INJECTION MOLDING

(75) Inventors: Yosif Kushnir, Overland Park, KS (US); Ian Fitzpatrick, New Market (CA)

(73) Assignee: Dollins Tool, Inc., Independence, MO (US)

Reexamination Request:
No. 90/006,815, Oct. 20, 2003

Reexamination Certificate for:
Patent No.: 6,478,567
Issued: Nov. 12, 2002
Appl. No.: 09/610,272
Filed: Jul. 6, 2000

Related U.S. Application Data

(63) Continuation-in-part of application No. 08/802,707, filed on Feb. 19, 1997, now abandoned.

(51) Int. Cl.⁷ .................................. B29C 45/20
(52) U.S. Cl. .................... 425/191; 425/549; 425/568
(58) Field of Search ................. 425/190, 191, 425/192 R, 568, 569, 571, 549

(56) References Cited

U.S. PATENT DOCUMENTS

| | | |
|---|---|---|
| 2,529,146 A | 11/1950 | Feitl |
| 4,268,241 A | 5/1981 | Rees et al. |
| 4,312,630 A | 1/1982 | Travaglini |
| 4,333,608 A | 6/1982 | Hendry |
| 4,434,053 A | 2/1984 | Osuna-Diaz |
| 5,054,689 A | 10/1991 | Hunerberg et al. |
| 5,106,283 A | 4/1992 | Sauer et al. |
| 5,208,052 A | 5/1993 | Schmidt et al. |
| 5,421,716 A | 6/1995 | Gellert |
| 5,464,342 A | 11/1995 | Marik et al. |
| 5,484,275 A | 1/1996 | Kushnir |
| 5,589,206 A | 12/1996 | Hepler |
| 5,700,499 A | 12/1997 | Bauer |

FOREIGN PATENT DOCUMENTS

GB  1097325  1/1968

OTHER PUBLICATIONS

"Kona Bushing for Sprueless Molding" from StackTeck Systems Ltd., dated Apr. 1987, Bulletin No. 201 (original brochure).

*Primary Examiner*—Tim Heitbrink

(57) ABSTRACT

A three piece nozzle assembly for injecting molten plastic in an injection molding machine carrying out a high pressure, high volume continuous molding process to mold thin walled parts. A nozzle housing has an internally threaded dual diameter bore in one end which receives in one bore portion an externally threaded shank of a nozzle. A sleeve is threaded into the other bore portion and is tightened adjacent to a flange on the nozzle shank to lock the nozzle to the housing and prevent the pressure of the injection molding from working the nozzle loose from the housing. A gap is formed between the sleeve and nozzle shank to reduce the thermal effects.

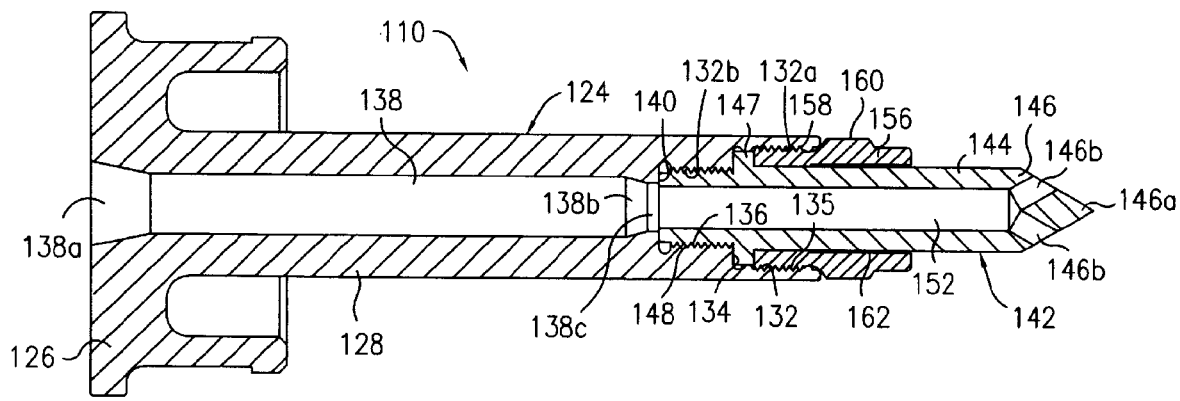

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *